(12) United States Patent
Berenshteyn et al.

(10) Patent No.: US 11,382,835 B2
(45) Date of Patent: Jul. 12, 2022

(54) DOSING DEVICE FOR MEASURING AND DISPENSING MINI-TABLETS

(71) Applicant: Merck Sharp & Dohme Corp., Rahway, NJ (US)

(72) Inventors: Annaniy Berenshteyn, Edgewater, NJ (US); Mikhail Gotliboym, Scotch Plains, NJ (US); Christopher Granelli, Chatham, NJ (US)

(73) Assignee: Merck, Sharp & Dohme LLC, Rahway, NJ (US)

( * ) Notice: Subject to any disclaimer, the term of this patent is extended or adjusted under 35 U.S.C. 154(b) by 675 days.

(21) Appl. No.: 16/346,158

(22) PCT Filed: Nov. 6, 2017

(86) PCT No.: PCT/US2017/060078
§ 371 (c)(1),
(2) Date: Apr. 30, 2019

(87) PCT Pub. No.: WO2018/089281
PCT Pub. Date: May 17, 2018

(65) Prior Publication Data
US 2020/0054530 A1    Feb. 20, 2020

Related U.S. Application Data

(60) Provisional application No. 62/419,641, filed on Nov. 9, 2016.

(51) Int. Cl.
*A61J 7/02* (2006.01)
*A61J 7/00* (2006.01)
*G01F 19/00* (2006.01)

(52) U.S. Cl.
CPC ............. *A61J 7/02* (2013.01); *A61J 7/0023* (2013.01); *G01F 19/007* (2013.01); *A61J 2200/70* (2013.01)

(58) Field of Classification Search
CPC ...... G06M 11/00; G06M 1/083; G06M 1/286; G06M 1/28; A61J 7/02; A61J 1/03; A61J 7/0023; A61J 2200/70; G01F 19/007
(Continued)

(56) References Cited

U.S. PATENT DOCUMENTS 2,722,934 A * 11/1955 Brackbill ............. A61J 7/0023
604/59
4,047,620 A    9/1977 Deininger
(Continued)

FOREIGN PATENT DOCUMENTS

DE    202009001737 U1    6/2009
GB          1263927 A *    2/1972    ............ G06M 11/00
GB          2438019          11/2007

OTHER PUBLICATIONS

International Search Report and Written Opinion for PCT/US2017/060078, dated Nov. 6, 2017; 9 pages.
(Continued)

*Primary Examiner* — Gregory W Adams
(74) *Attorney, Agent, or Firm* — John C. Todaro (57) ABSTRACT

A multiple dose spoon device for scooping, retaining, and delivering to a patient a specific number of mini-tablets from a container, e.g., bottle, or bulk pile, of mini-tablets. The device comprises a top housing, a bottom housing, and one or two sliders movably positioned between top housing and bottom housing, said: a) top housing having a plurality of nests, and also having a handle with an open window and slider retention notches, and b) one or two sliders with slider tabs, having a plurality of sequential whole number markings equivalent to the plurality of nests, and a plurality minus 1 of tablet blocking ribs, wherein slider movement is regulated by the slider retention notches, and wherein the plurality of nests and the plurality of whole number mark-
(Continued)

ings are a same number. Alternatively, the top housing does not have slider retention notches, and the one or two sliders have slider retention notches.

14 Claims, 8 Drawing Sheets

(58) Field of Classification Search
USPC .......................... 221/69; 414/675; D10/46.3
See application file for complete search history.

(56) References Cited

U.S. PATENT DOCUMENTS

| | | | |
|---|---|---|---|
| 4,065,000 A | 12/1977 | Murton | |
| 4,901,865 A * | 2/1990 | Staples | A61J 3/10 |
| | | | 209/703 |
| 7,021,492 B2 * | 4/2006 | Priebe | A61J 7/02 |
| | | | 221/296 |
| 7,950,202 B2 * | 5/2011 | Kodama | B65B 5/103 |
| | | | 53/247 |
| 9,103,708 B2 * | 8/2015 | Robbins | G01F 19/002 |
| 2009/0266837 A1 | 10/2009 | Gelardi et al. | |
| 2010/0181335 A1 * | 7/2010 | Farrar | A61J 1/035 |
| | | | 221/89 |
| 2011/0126619 A1 | 6/2011 | Robbins | |

OTHER PUBLICATIONS

Supplementary European Search Report for 17868730.7, dated May 14, 2020, 6 pages.

* cited by examiner

DOSING DEVICE FOR MEASURING AND DISPENSING MINI-TABLETS

CROSS REFERENCE TO RELATED APPLICATIONS

This application is a U.S. National Phase application under 35 U.S.C. § 371 of PCT Application No. PCT/US2017/060078 filed Nov. 6, 2017, which claims priority from U.S. Ser. No. 62/419,641 filed Nov. 9, 2016.

BACKGROUND OF THE INVENTION

Mini-tablets, also referred to as compressed granules, are a desirable form of dosage for many applications, including pediatric dosage, for patients with dysphagia (swallowing difficulties), and in applications where rapid and/or flexible dose adjustments are needed. For pediatric patients, mini-tablets allow for the use of weight based dosage forms to children as young as six months to 2 years. Mini-tablets can also easily be mixed with liquid and soft foods to assist in administration to younger pediatric patients.

There are known dosing devices for dispensing the exact number of mini-tablets. See, for example, U.S. Pat. No. 6,811,054 and NL66782. The main disadvantage of these devices is that they only allow for accurate dispensing of a predetermined number of mini-tablets, corresponding to the number of fixed tablet-nests (also referred to as cavities) in the dosing chamber. These inventions do not allow for adjustment of the number of tablets to be dispensed. In addition, because the devices are not equipped with the means to set or verify the required number of the mini-tablets, there is a potential for miscount.

SUMMARY OF THE INVENTION

The invention is a multiple dose spoon device for scooping, retaining, and delivering to a patient a specific number of mini-tablets from a container, e.g., bottle, or bulk pile, of mini-tablets. The device comprises a top housing, a bottom housing, and one or two sliders movably positioned between the top housing and the bottom housing, said:

a) top housing having a plurality of nests, and also having a handle with an open window and slider retention notches, and b) one or two sliders with slider tabs, having a plurality of sequential whole number markings equivalent to the plurality of nests, and a plurality minus 1 of tablet blocking ribs, wherein slider movement is regulated by slider retention notches, and wherein the plurality of nests and the plurality of the whole number markings are a same number. Alternatively, the top housing does not have slider retention notches, and the one or two sliders have slider retention notches. "Plurality minus 1" of tablet blocking ribs means that the number of tablet blocking ribs is one less than the number of sequential whole number markings and one less than the number of nests.

DETAILED DESCRIPTION OF THE INVENTION

Figure 8:
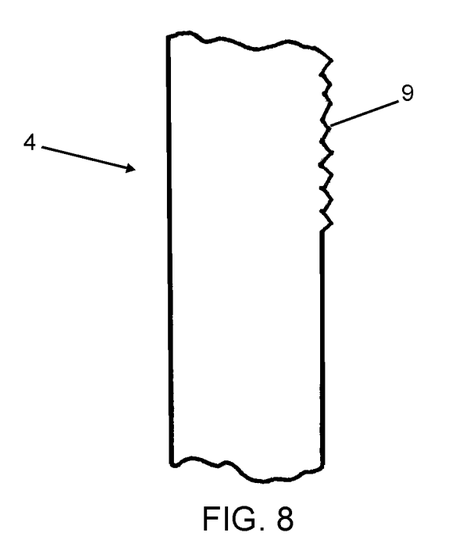
FIG. 8 is a top view of an alternate embodiment of the slider.

An embodiment of the device comprises the top housing, the bottom housing, and one or two sliders movably positioned between the top housing and the bottom housing, said:

a) top housing having between 1 and 48 tablet nests, and also having a handle with an open window and slider retention notches, and b) one or two sliders with slider tabs, having between 1 and 48 sequential whole number markings and between 1 and 47 tablet blocking ribs, wherein slide movement is regulated by slider retention notches. Alternatively, the top housing does not have slider retention notches, and the one or two sliders have slider retention notches (FIG. 8).

An embodiment of the device comprises the top housing, the bottom housing, and one or two sliders movably positioned between the top housing and the bottom housing, said:

a) top housing having between 1 and 24 tablet nests, and also having a handle with an open window and slider retention notches, and b) one or two sliders with slider tabs, having between 1 and 24 sequential whole number markings and between 1 and 23 tablet blocking ribs, wherein slider movement is regulated by the slider retention notches. Alternatively, the top housing does not have slider retention notches, and the one or two sliders have slider retention notches.

An embodiment of the device comprises the top housing, the bottom housing, and one or two sliders movably positioned between the top housing and the bottom housing, said:

a) top housing having between 1 and 20 tablet nests, and also having a handle with an open window and slider retention notches, and b) one or two sliders with slider tabs, having between 1 and 20 sequential whole number markings and between 1 and 19 tablet blocking ribs, wherein slider movement is regulated by the slider retention notches. Alternatively, the top housing does not have slider retention notches, and the one or two sliders have slider retention notches.

The multiple dose spoon device described herein provides the means for accurate adjustment and verification of the required number of the mini-tablets to be dispensed.

The multiple dose spoon is a device for scooping, retaining, and delivering to a patient a specific number of mini-tablets (compressed oral granules) from a container of mini-tablets, e.g., a bottle, or bulk pile. Mini-tablets have a diameter range of between about 0.5 mm to about 6.0 mm, preferably between about 1.0 mm to about 3.0 mm. The number of scooped mini-tablets is determined by moving a slider control until the desired number is displayed in a number display window. As the slider control is advanced or retracted, spoon cavities (also referred to as "nests") become occluded or open. The number displayed in the window corresponds to the number of open nests. After the desired number of nests is displayed in the window, the multiple dose spoon is scooped into a container of mini-tablets. As the spoon is removed from the container, the desired number of mini-tablets are contained by the open nests. The multiple dose spoon nests containing the desired amount of mini-tablets are emptied into a receptacle that can be used to deliver the mini-tablets to the patient.

The device can be used to conveniently and accurately measure whole number amounts of mini-tablet by sliding the slider until the desired number of mini-tablets is displayed in the open window, by positioning that number, present on the slider, in a position so it is displayed in the open window. When the desired number of mini-tablets is displayed, the appropriate number of tablet blocking ribs will be in position with the corresponding number of nests such that those nests are blocked and unable to receive and contain a mini-tablet. In this position, only the unblocked nests, corresponding to the number of desired mini-tablets, will be able to receive and contain mini-tablets.

In an embodiment of the invention, the nests are staggered. In any slider position, there is a partially blocked nest which functions just as a fully blocked nest does, since a mini-tablet can only fit into a fully opened nest. For example, in a first position, one nest is fully opened and can accept a mini-tablet, one is partially blocked, i.e., partially open, such that it cannot accept a tablet. In a second position, two nests are fully opened and can accept mini-tablets, one is partially blocked and cannot accept a mini-tablet, and the rest of the nests are fully blocked. Additional slider positions are available to block alternative numbers of nests in this same way, with one next being partially block but unable to accept a mini-tablet. The final slider position does not block any nests and all of the nests in the device are able to accept a mini-tablet.

An embodiment of the device comprises one slider, between 1 and 20 tablet nests, and between 1 and 19 tablet blocking ribs.

A further embodiment of the device comprises between 0 and 19 tablet blocking ribs engaged with tablet nests.

A further embodiment of the device comprises a slider whole number marking displayed through the handle open window.

A further embodiment of the device comprises the arrangement wherein the slider whole number corresponds to the number of nests that are not engaged by the tablet blocking ribs.

In another embodiment, the device comprises the top housing, the bottom housing, and one or two sliders movably positioned between the top housing and the bottom housing, wherein a) the top housing has between 1 and 24 tablet nests, and also has a handle with an open window, and wherein b) one or two sliders have slider tabs, have slider retention notches and also have between 1 and 24 sequential whole number markings and between 1 and 23 tablet blocking ribs, wherein slider movement is regulated by the slider retention notches.

The device can be used to conveniently and accurately measure whole number amounts of mini-tablet by sliding the slide until the desired number of mini-tablets is displayed in the open window, by positioning that number, present on the slider, in a position so it is displayed in the open window. When the desired number of mini-tablets is displayed, the appropriate number of tablet blocking ribs will be in position with the corresponding number of nests such that those nests are blocked and unable to receive and contain a mini-tablet. In this position, only the unblocked nests, corresponding to the number of desired mini-tablets, will be able to receive and contain mini-tablets.

An embodiment of the device comprises one slider, between 1 and 20 tablet nests, and between 1 and 19 tablet blocking ribs.

A further embodiment of the device comprises between 0 and 19 tablet blocking ribs engaged with tablet nests.

A further embodiment of the device comprises a slider whole number marking displayed through the handle open window.

A further embodiment of the device comprises the arrangement wherein the slider whole number corresponds to the number of nests that are not engaged by the tablet blocking ribs.

The multiple dose spoon provides the user with a counting tool for obtaining a desired number of mini-tablets from a container or bulk pile in 1-unit increments and delivering the mini-tablets to a target dispense site, such as a liquid, or solid food, to be consumed by a patient.

The device can be used with any program that utilizes mini-tablets. The multiple dose spoon can be used to develop any dose count, e.g., from 1-24, in 1 unit increments.

Advantages of the device include the following: they are intuitive, familiar, and easy to use, just like a household spoon; there is minimal risk of broken or crushed mini-tablets; the device offers a highly reliable and accurate scooping and metering mechanism in 1 unit increments; it is easy to verify the proper count of mini-tablets; the device provides a large dose count number window for verification of dose setting; it is easily cleanable; it has a simple, three part design; it has a single ratcheting slide control for setting the desired dose; it has an ergonomic design contoured for use with standard glass clinical bottles.

Figure 1:
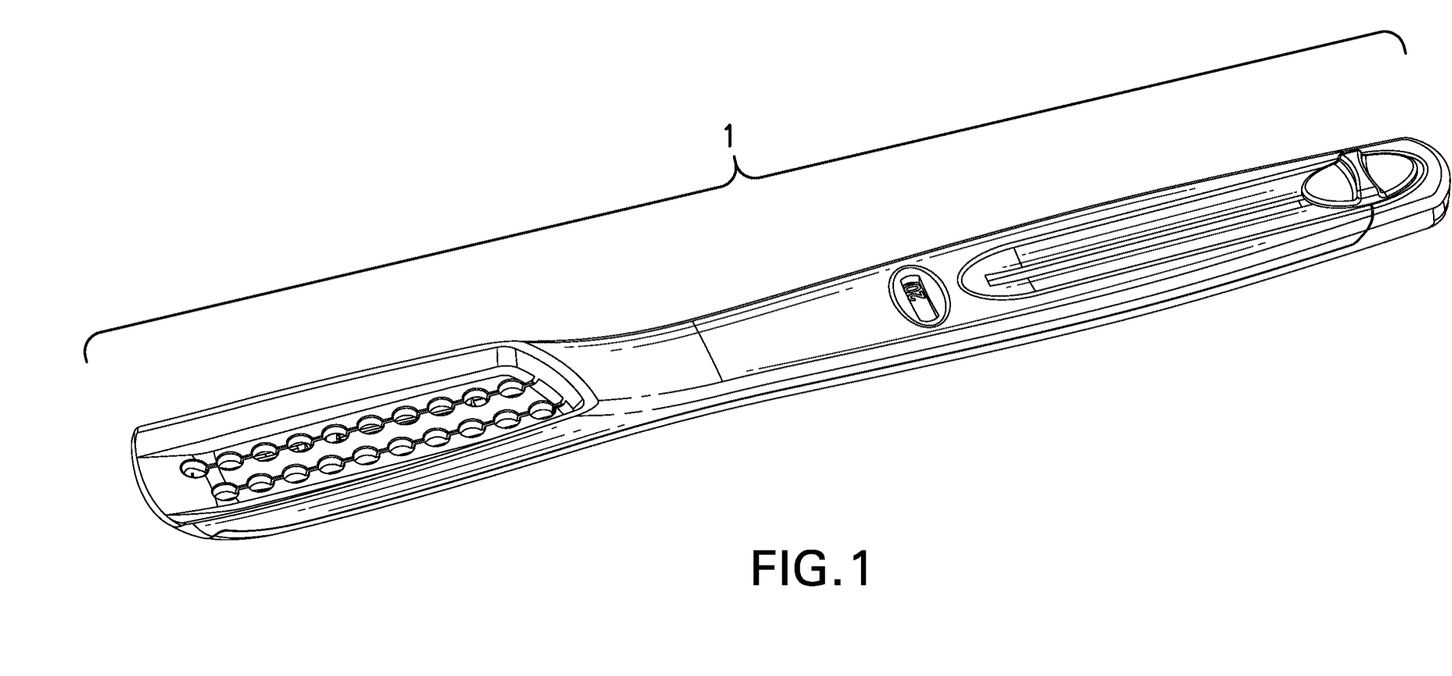
FIG. 1 is a perspective view of the dosing spoon device.

A preferred embodiment of the dosing spoon device described herein can be seen in FIG. 1 which shows Dosing Spoon 1.

Figure 2:
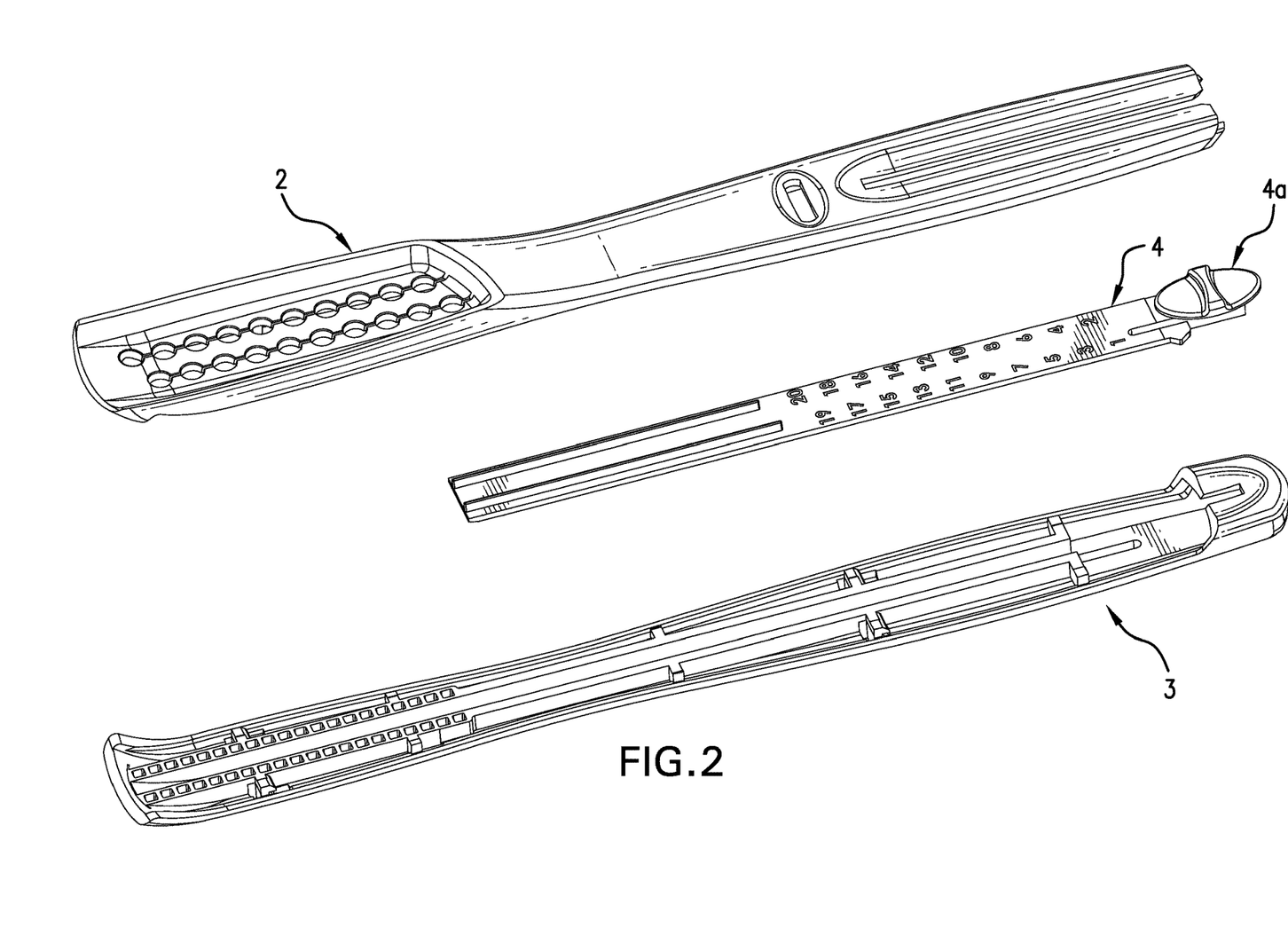
FIG. 2 is an exploded view showing a top housing, a bottom housing, a slider and a slider tab.

FIG. 2 shows three parts: Top Housing 2, Bottom Housing 3, Slider 4. Slider 4 has Slider Tab 4a.

Figure 3:
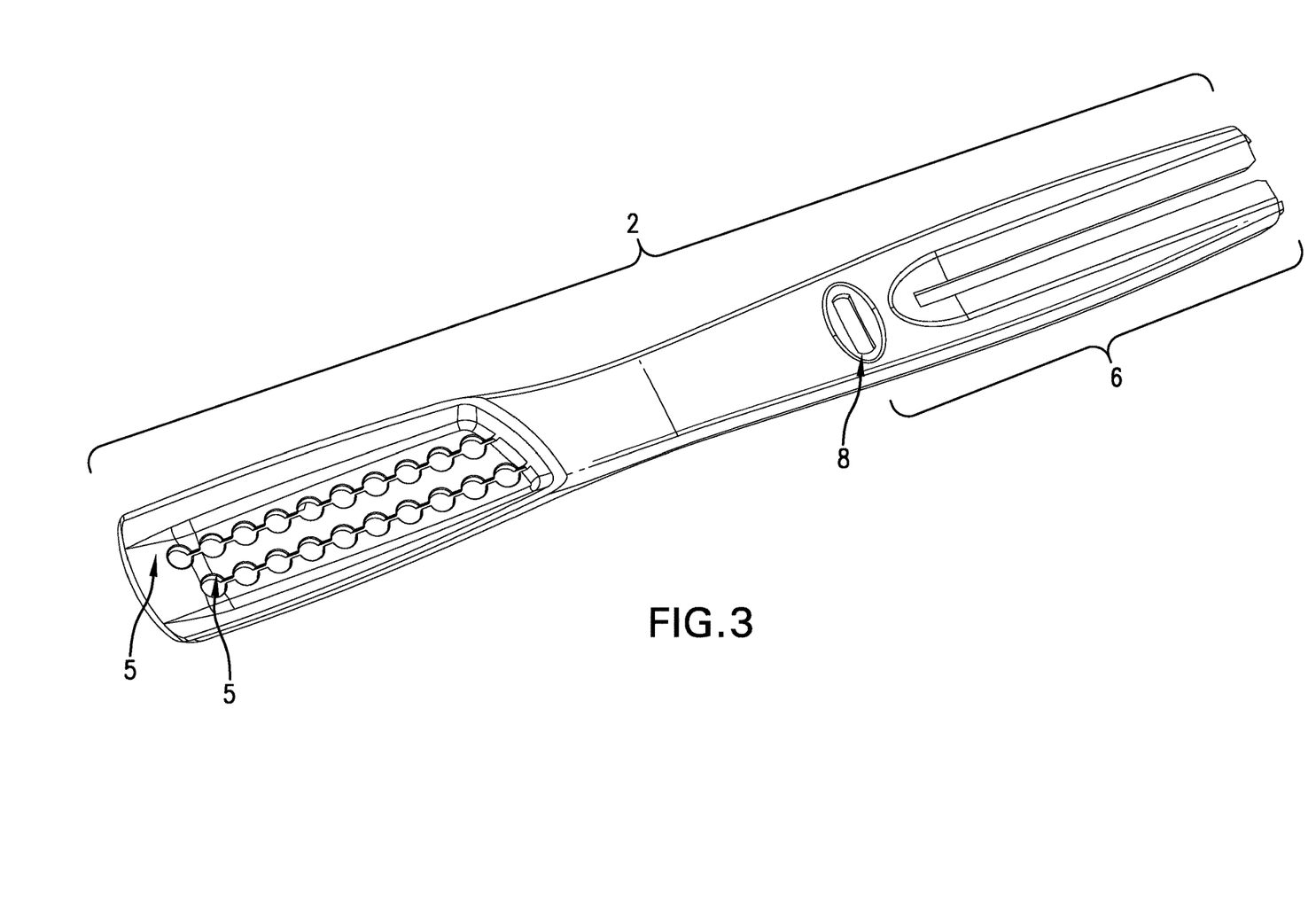
FIG. 3 is a top view of the top housing.

FIG. 3 shows Top Housing 2 comprising Tablet Nests 5, Dose Indicating Window 8, and Handle 6. In a preferred embodiment, Dosing Spoon 1 comprises 20 nests arrayed in 2 10-nest rows, which can allow for retrieval of up to 20 tablets. Tablet Nests 5 are arranged in two parallel rows. In a preferred embodiment, Handle 6 comprises a Dose Indicating Window 8.

Figure 4:
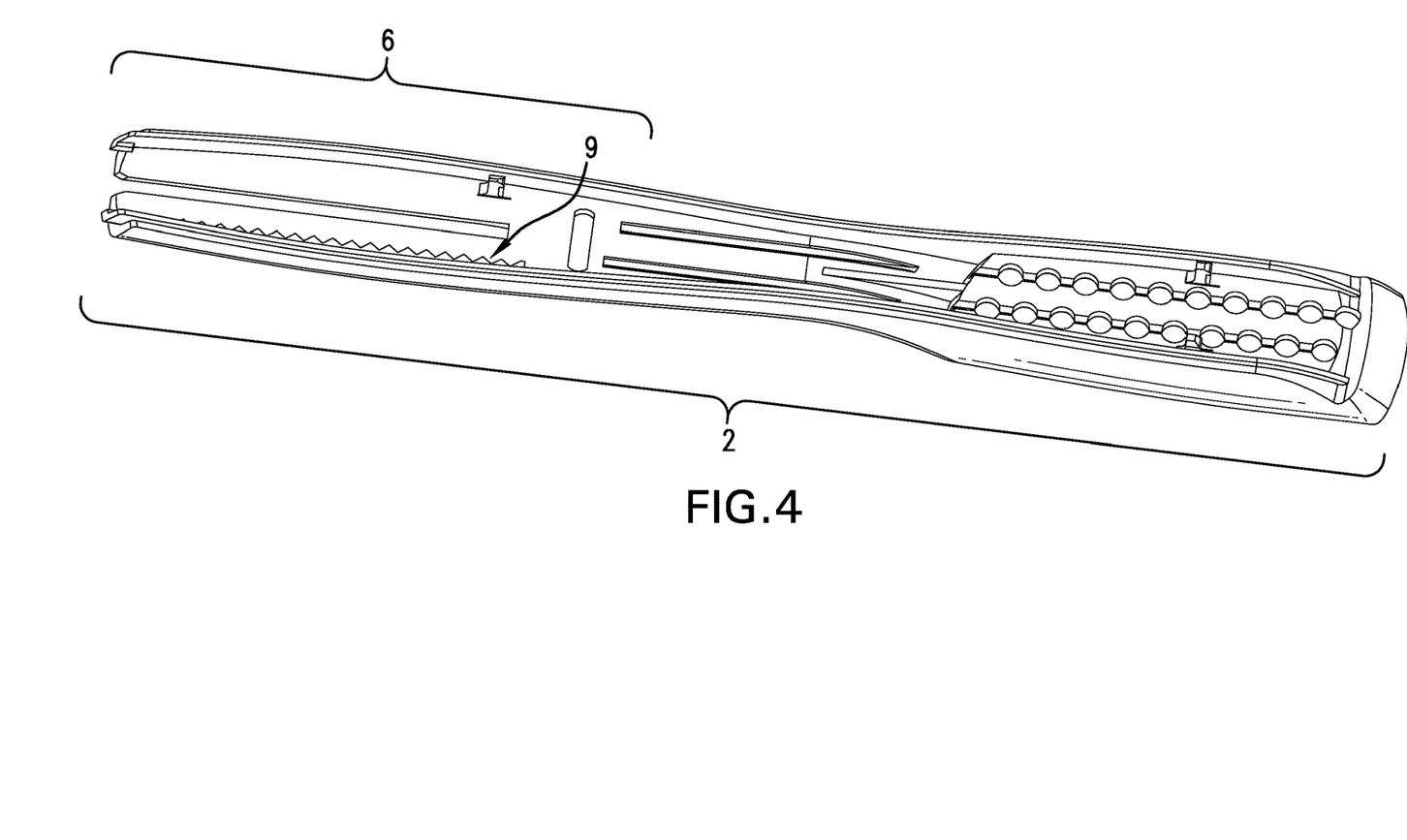
FIG. 4 is another top view of the top housing.

FIG. 4 shows a preferred embodiment of Top Housing 2 with Handle 6 comprising Slider Retention Notches 9.

Figure 5:
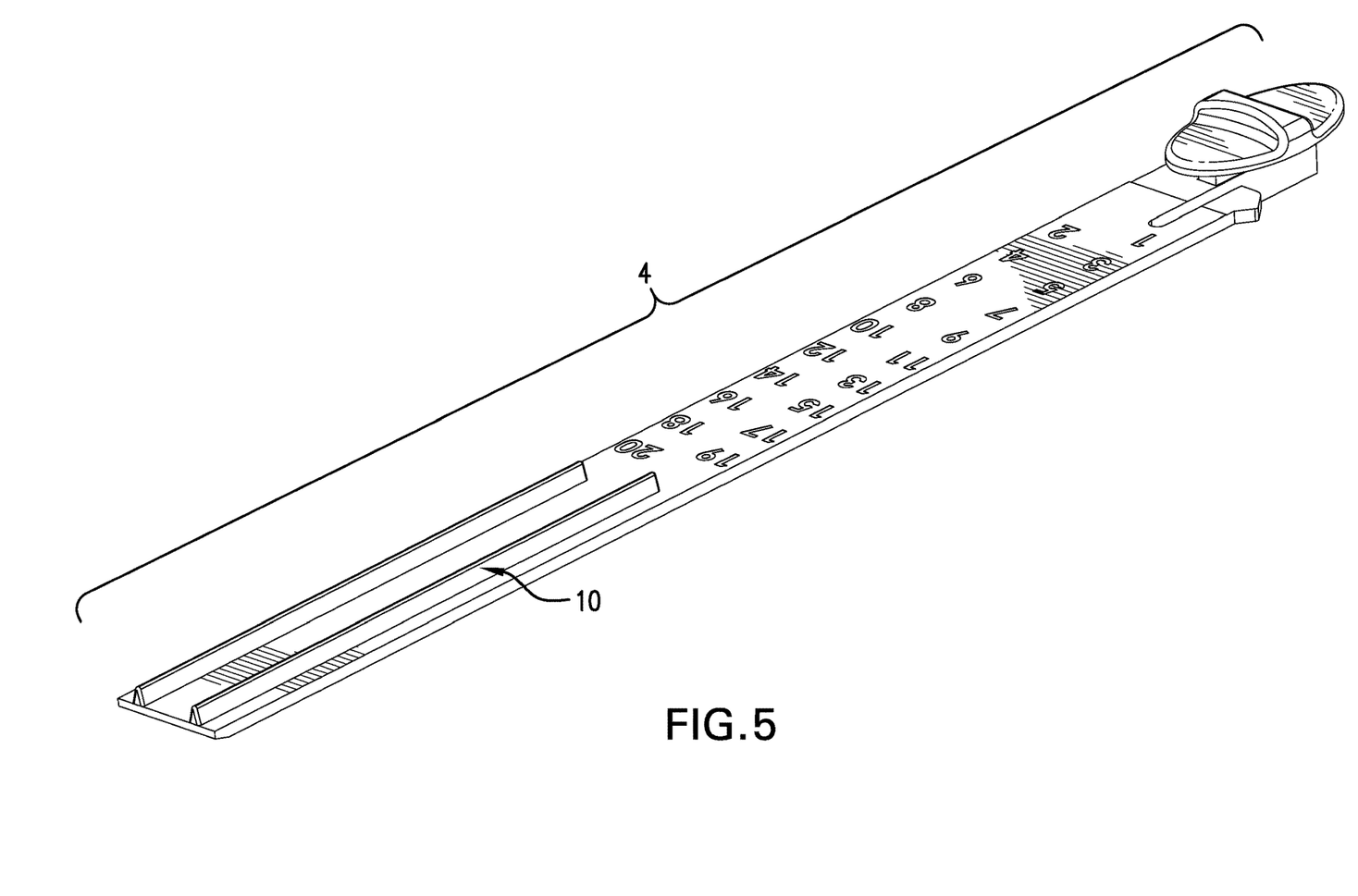
FIG. 5 is a perspective view of the slider.

FIG. 5 shows a preferred embodiment of Slider 4 having one or more V-shaped Tablet Blocking Ribs 10 that align with the rows of Tablet Nests 5. Slider 4 is positioned adjacent to and below the Top Housing 2, such that the presence of a Tablet Blocking Rib 10 beneath a particular Tablet Nest 5 prevents seating of a mini-tablet in that Tablet Nest 5. Conversely, the absence of a Tablet Blocking Rib 10 beneath a particular Tablet Nest 5 allows a mini-tablet to fully seat itself in that Tablet Nest 5. As the Slider 4 is moved in the distal direction, away from the user, the Tablet Blocking Ribs 10 successively block an increasing number of Tablet Nests 5. At the extreme proximal end, where Slider 4 is positioned nearest the user, all 20 Tablet Nests 5 are unblocked and are able to receive mini-tablets. At the extreme distal end of Slider 4 travel, 19 Tablet Nests 5 are blocked, such that only one nest can receive a mini-tablet. The multi-dose spoon cannot be set to deliver zero mini-tablets.

Figure 6:
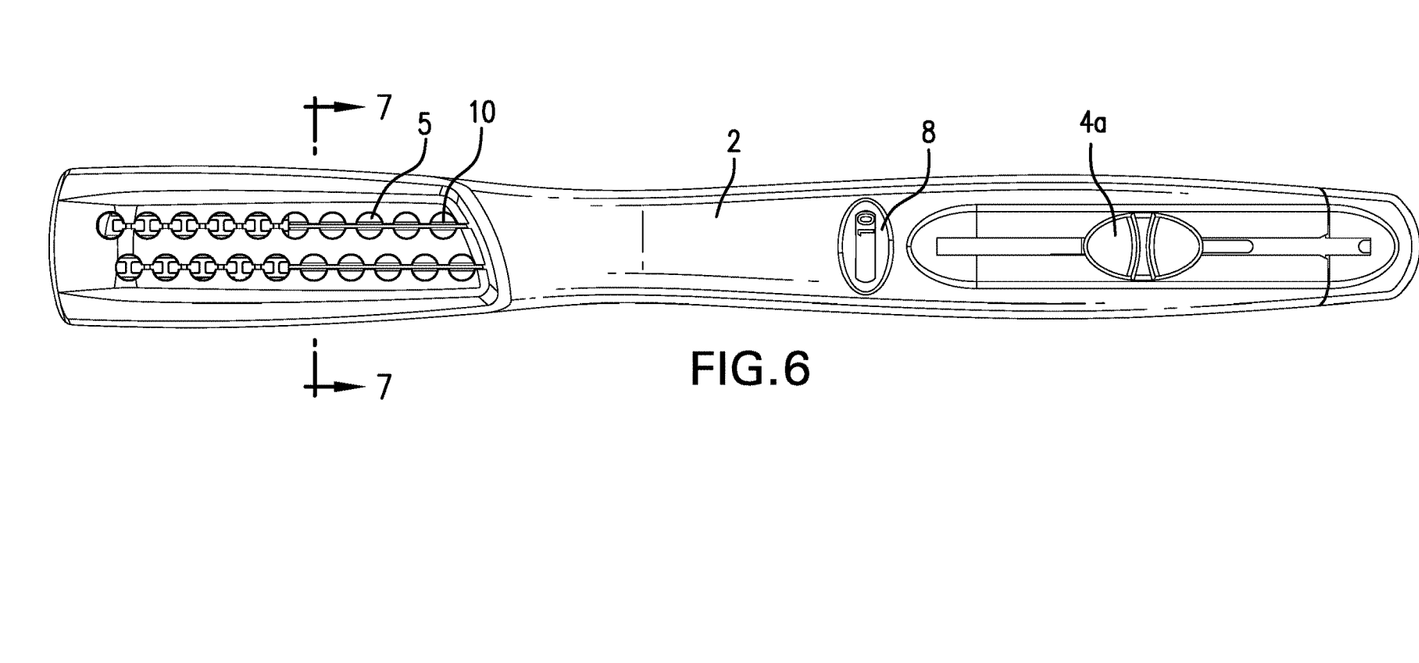
FIG. 6 is a top view of the dosing spoon device showing tablet blocking ribs engaged with tablet nests.

FIG. 6 shows dosing spoon device showing Top Housing 2, Dose Indicating Window 8, Slider Tab 4a, with ten Engaged Nests 7 where ten Tablet Blocking ribs 10 engaged with ten Tablet Nests 5.

Figure 7:
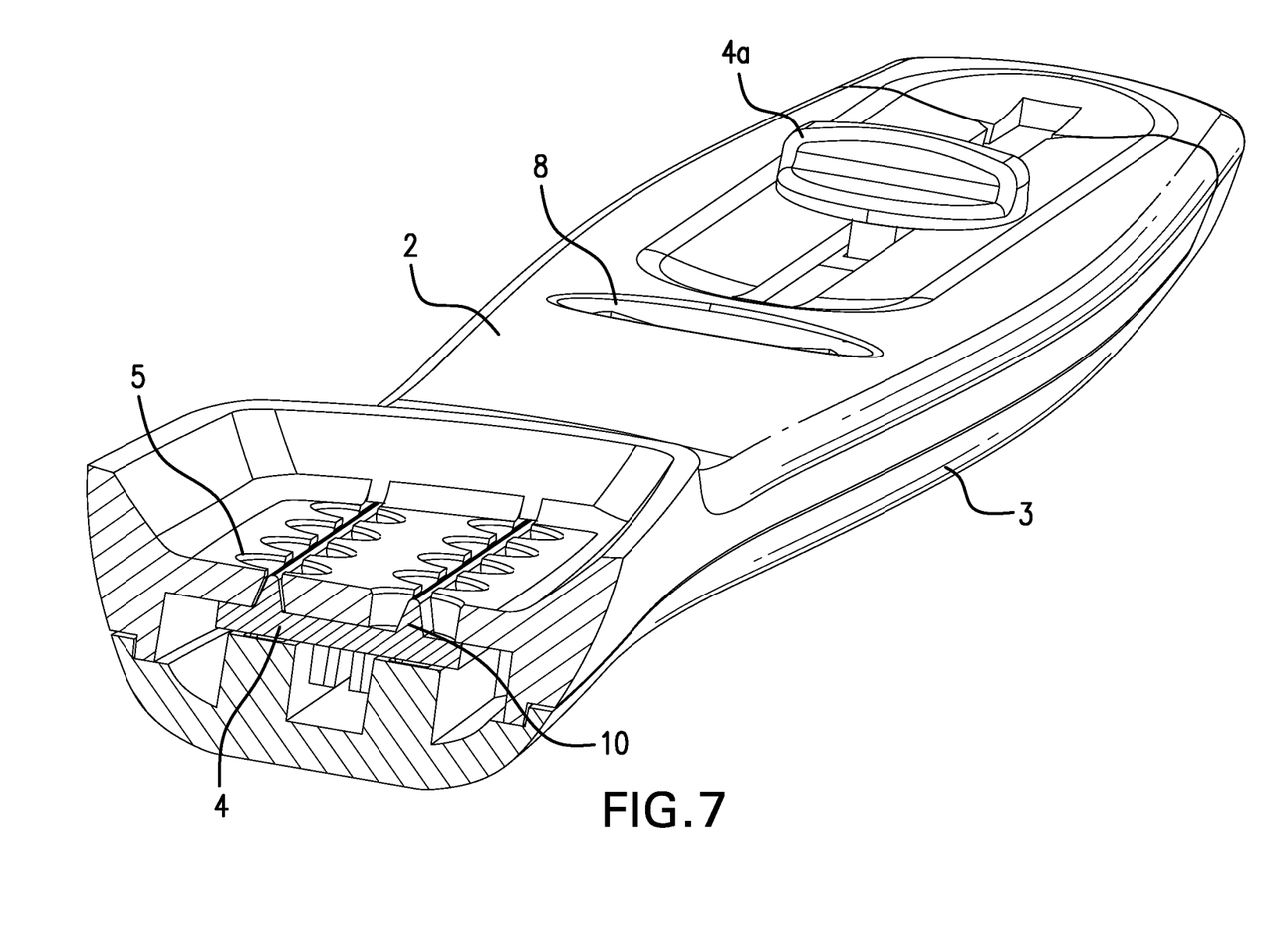
FIG. 7 is a partial cross-sectional view of the dosing spoon device showing tablet blocking ribs engaged with tablet nests.

FIG. 7 is a partial cross-sectional view of the dosing spoon device showing Top Housing 2, Dose Indicating Window 8, Slider Tab 4a, Slider 4, Bottom Housing 3, with eight Tablet Blocking ribs 10 engaged with eight Tablet Nests 5.

In another embodiment, the device can comprise two or more parallel sliders, wherein each slider comprises a single Tablet Blocking Rib 10, so that each slider controls the opening of Tablet Nests 5 in a single row. In another embodiment, the device comprises one, two, three, four, five or six Tablet Nests 5. In another embodiment, the device comprises 6, 7, 8, 9, 10, 11, or 12 Tablet Nests 5. In another embodiment, the device comprises 12, 13, 14, 15, 16, 17, 18, 19, 20, 21, 22, 23, or 24 Tablet Nests 5. In another embodiment, the device comprises two parallel rows of Tablet Nests 5, with each row comprising five Tablet Nests 5.

What is claimed is:

1. A device comprising a top housing, a bottom housing, and one or two sliders movably positioned between the top housing and the bottom housing, said:
   a) top housing having a plurality of nests, and also having a handle with an open window and slider retention notches, and
   b) one or two sliders with slider tabs, having a plurality of sequential whole number markings equivalent to the plurality of nests, and a plurality minus 1 of tablet blocking ribs,
   wherein slider movement is regulated by the slider retention notches, and wherein the plurality of nests and the plurality of whole number markings are a same number.

2. A device of claim 1 wherein the plurality of nests is between 1 and 48, the plurality of sequential whole number markings is between 1 and 48, and the plurality minus 1 of tablet blocking ribs is between 1 and 47.

3. A device of claim 1 comprising the top housing, the bottom housing, and the one or two sliders movably positioned between the top housing and the bottom housing:
   a) the top housing having between 1 and 24 tablet nests, and also having the handle with the open window and the slider retention notches, and
   b) one or two sliders with the slider tabs, having between 1 and 24 sequential whole number markings and between 1 and 23 tablet blocking ribs,
   wherein slider movement is regulated by the slider retention notches.

4. A device of claim 3, comprising one slider, between 1 and 20 tablet nests, and between 1 and 19 tablet blocking ribs.

5. A device of claim 4, wherein between 0 and 19 tablet blocking ribs engage tablet nests.

6. A device of claim 3, wherein one making of the slider whole number markings is displayed through the handle open window.

7. A device of claim 6, wherein the slider whole number corresponds to the number of nests that are not engaged by the tablet blocking ribs.

8. A device comprising a top housing, a bottom housing, and the one or two sliders movably positioned between the top housing and the bottom housing, said:
   a) top housing having a plurality of nests, and also having a handle with an open window, and
   b) one or two sliders having slider retention notches and having a plurality of sequential whole number markings equivalent to the plurality of nests, and a plurality minus 1 of tablet blocking ribs,
   wherein slider movement is regulated by the slider retention notches, and wherein the plurality of nests and the plurality of whole number markings are a same number.

9. A device of claim 8 wherein the plurality of nests is between 1 and 48, the plurality of sequential whole number markings is between 1 and 48, and the plurality minus 1 of tablet blocking ribs is between 1 and 47.

10. A device of claim 8 comprising the top housing, the bottom housing, and one or two sliders movably positioned between the top housing and the bottom housing, said:
    a) top housing having between 1 and 24 tablet nests, and
    b) the one or two sliders having between 1 and 24 sequential whole number markings and between 1 and 23 tablet blocking ribs.

11. A device of claim 10, comprising one slider, between 1 and 20 tablet nests, and between 1 and 19 tablet blocking ribs.

12. A device of claim 11, wherein between 0 and 19 tablet blocking ribs engage tablet nests.

13. A device of claim 10, wherein a slider whole number marking is displayed through the handle open window.

14. A device of claim 13, wherein the slider whole number corresponds to the number of nests that are not engaged by the tablet blocking ribs.

* * * * *